United States Patent
Machii et al.

(10) Patent No.: US 6,885,938 B2
(45) Date of Patent: Apr. 26, 2005

(54) TERMINAL APPARATUS FOR DOWNLOADING MAP

(75) Inventors: Kimiyoshi Machii, Hitachi (JP); Shigeru Matsuo, Hitachinaka (JP); Katsuaki Tanaka, Hitachi (JP); Yoshinori Endo, Mito (JP); Mariko Okude, Hitachi (JP); Michio Morioka, Hitachi (JP)

(73) Assignees: Hitachi, Ltd., Tokyo (JP); Xanavi Informatics Corporation, Zama (JP)

( * ) Notice: Subject to any disclaimer, the term of this patent is extended or adjusted under 35 U.S.C. 154(b) by 0 days.

(21) Appl. No.: 10/438,102

(22) Filed: May 15, 2003

(65) Prior Publication Data

US 2003/0204307 A1 Oct. 30, 2003

Related U.S. Application Data

(63) Continuation of application No. 09/949,924, filed on Sep. 12, 2001, now abandoned.

(30) Foreign Application Priority Data

Sep. 13, 2000 (JP) ........................................ 2000-283794

(51) Int. Cl.$^7$ ................................................ G01C 21/32
(52) U.S. Cl. ................... 701/208; 701/210; 340/995.12; 340/995.15
(58) Field of Search ................................ 701/208, 200, 701/201, 209, 210; 340/995.12, 995.15, 995.19, 995.23

(56) References Cited

U.S. PATENT DOCUMENTS

| | | | |
|---|---|---|---|
| 5,808,566 A | 9/1998 | Behr et al. | 340/995.12 |
| 5,944,768 A | 8/1999 | Ito et al. | 340/990 |
| 5,959,577 A | 9/1999 | Fan et al. | 342/357.13 |
| 6,052,645 A * | 4/2000 | Harada | 701/212 |
| 6,061,003 A * | 5/2000 | Harada | 340/995.15 |
| 6,073,075 A | 6/2000 | Kondou et al. | 340/988 |
| 6,202,025 B1 * | 3/2001 | Harada | 340/995.18 |
| 6,278,941 B1 * | 8/2001 | Yokoyama | 701/209 |
| 6,324,467 B1 * | 11/2001 | Machii et al. | 701/200 |
| 6,330,453 B1 * | 12/2001 | Suzuki et al. | 455/457 |
| 6,430,499 B1 | 8/2002 | Nakano et al. | 701/208 |
| 6,438,488 B1 * | 8/2002 | Lee | 701/208 |

FOREIGN PATENT DOCUMENTS

| | | |
|---|---|---|
| DE | 4118603 A1 | 12/1991 |
| DE | 19848006 | 4/2000 |
| JP | 200055682 | 2/2000 |
| WO | 0102806 | 1/2001 |

* cited by examiner

*Primary Examiner*—Tan Q. Nguyen
(74) *Attorney, Agent, or Firm*—Mattingly, Stanger, Malur & Brundidge, P.C.

(57) ABSTRACT

A terminal apparatus has a simple map installed therein. When a map is desired, it is checked whether or not a map of a desired place exists in the simple map. If it exists, the map of the desired place is loaded from the simple map, or if it does not exist, the map of the desired place is downloaded from a navigation server.

5 Claims, 16 Drawing Sheets

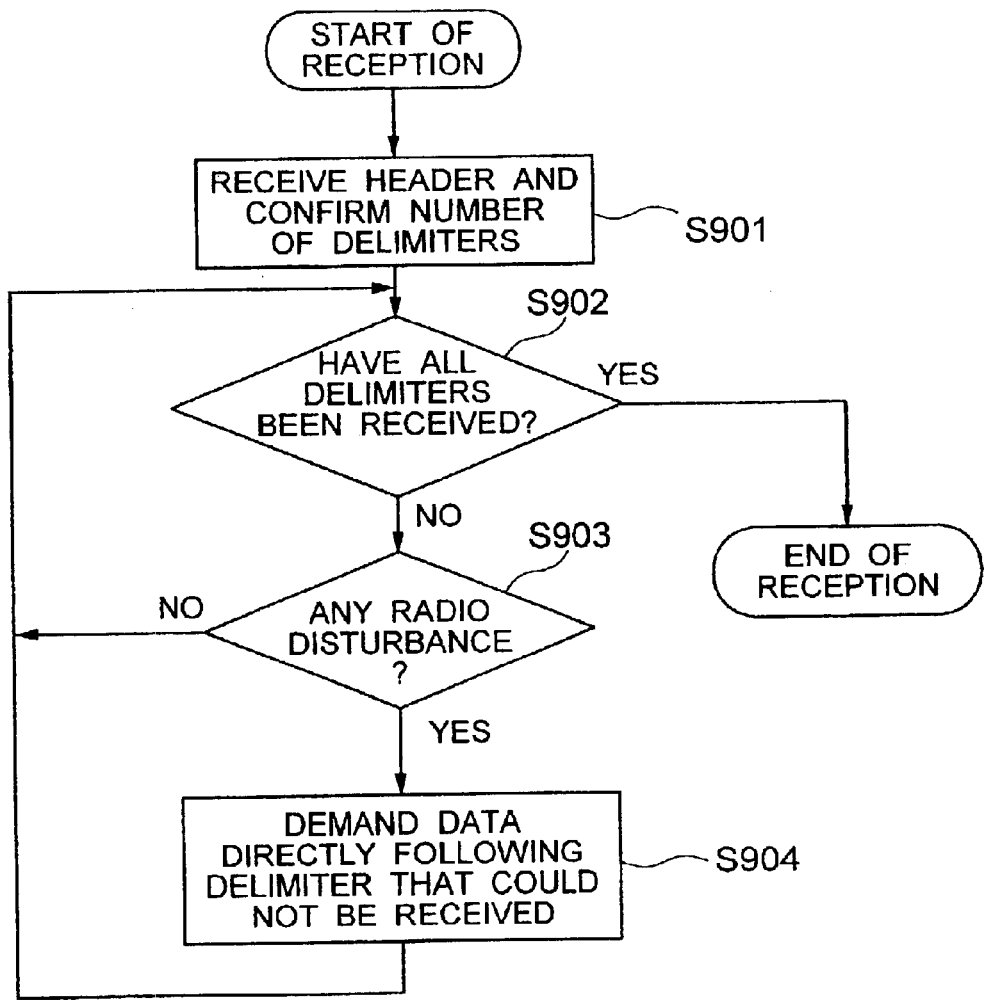

TERMINAL APPARATUS FOR DOWNLOADING MAP

The present application is a continuation of application Ser. No. 09/949,924, filed Sep. 12, 2001, now abandoned, the contents of which are incorporated herein by reference.

BACKGROUND OF THE INVENTION

The present invention relates to a terminal apparatus for downloading a map.

As a car-mounted equipment, there is a navigation apparatus in which a map data is stored in a storage medium such as CD-ROM, and read, upon required, by driving the storage medium with a disk driver to retrieve a guidance path.

Alternatively, there is a known navigation method. In the known navigation method, a place of departure and a destination are transmitted from a car-mounted server to an information center. The information center retrieves a guidance path from the place of departure to the destination to transmit guidance path data and map data for displaying the guidance path to the car-mounted server. The car-mounted server inputs the guidance path data and the map data into a navigation device. The navigation device conducts path guidance, employing the guidance path data and the map data.

A document regarding a car navigation terminal apparatus and navigation method of this type is JP-A-2000-55682 specification or the like, for example.

However, in the above-described car navigation apparatus, there is a problem that it is expensive because the storage medium such as CD-ROM for storing the map data and the driver are equipped with the car navigation apparatus itself. In the above-described navigation method, the storage medium and the driver are not needed and therefore, a low cost can be achieved. There is, however, a problem that telecommunication time becomes longer and telecommunication fee becomes higher, because it is required to download the guidance path data and the map data from the information center every time of telecommunication.

SUMMARY OF THE INVENTION

It is an object of the present invention to provide a terminal apparatus in which telecommunication load is reduced and the telecommunication fee is less expensive.

According to a first aspect of the invention, there is provided a terminal apparatus in which a simple map is installed and when a map is desired, it is checked whether or not a map of a desired place exists in the simple map, and if it exists, the map of the desired place is loaded from the simple map, or if it does not exist, the map of the desired place is downloaded from a navigation server.

The simple map is a map composed of specific sorts of roads.

The specific sorts of roads include expressways and national roads.

The simple map is a rough map at lower level.

The simple map is a display map that does not include any map for retrieval.

According to a second aspect of the invention, there is provided a terminal apparatus in which a simple map is installed and when a map is desired, it is checked whether or not a map of a desired place exists in the simple map, and if it exists, the map of the desired place is loaded from the simple map and data for creating a guide map including a guidance point is downloaded from a navigation server, or if it does not exist, a small sectional map including a guidance point is downloaded from the navigation server.

The guide map involves data for guiding a traveling direction at a position permitting traveling in plural directions.

According to a third aspect of the invention, there is provided a terminal apparatus in which a simple map is installed and when a map is desired, it is checked whether or not a map of a current position is in the simple map, and if it exists, the current position map is loaded from the simple map, or if it does not exist, the current position map is downloaded from a navigation server.

According to a fourth aspect of the invention, there is provided a terminal apparatus in which a simple map comprising specific sorts of roads is installed and when a map is desired, if a car passes through the specific sorts of roads, the simple map is loaded, or if the car passes through any other road than the specific sorts of roads, a map of a current position is downloaded from a navigation server.

The specific sorts of roads comprises expressways and national roads.

According to a fifth aspect of the invention, there is provided a terminal apparatus in which a simple map is installed and when a map is desired, it is checked whether or not a map of a desired place exists in the simple map, and if it exists, the map of the desired place is loaded from the simple map, or if it does not exist, a remaining storable capacity of medium storing the simple maps is notified to a navigation server, and a map edited in accordance with the remaining storable capacity is downloaded from the navigation server.

According to a sixth aspect of the invention, there is provided a terminal apparatus in which a simple map is installed and when a map is desired, it is checked whether or not a map of a desired place exists in the simple map, and if it exists, the map of the desired place is loaded from the simple map, or if it does not exist, map data with flagged components is received from a navigation server.

In receiving the map data with flagged components, if there is a radio disturbance, the map data following the map data directly before a flag that could not be received is demanded to receive all the flagged components.

BRIEF DESCRIPTION OF THE DRAWINGS

FIG. 9 is a flowchart for receiving a map from the navigation server;

FIG. 10 is a diagram showing an example of a management table of map data held by the terminal apparatus;

FIG. 19 is a view showing an example of information that the terminal apparatus downloads as guidance point information.

DESCRIPTION OF PREFERRED EMBODIMENTS

Figure 1:
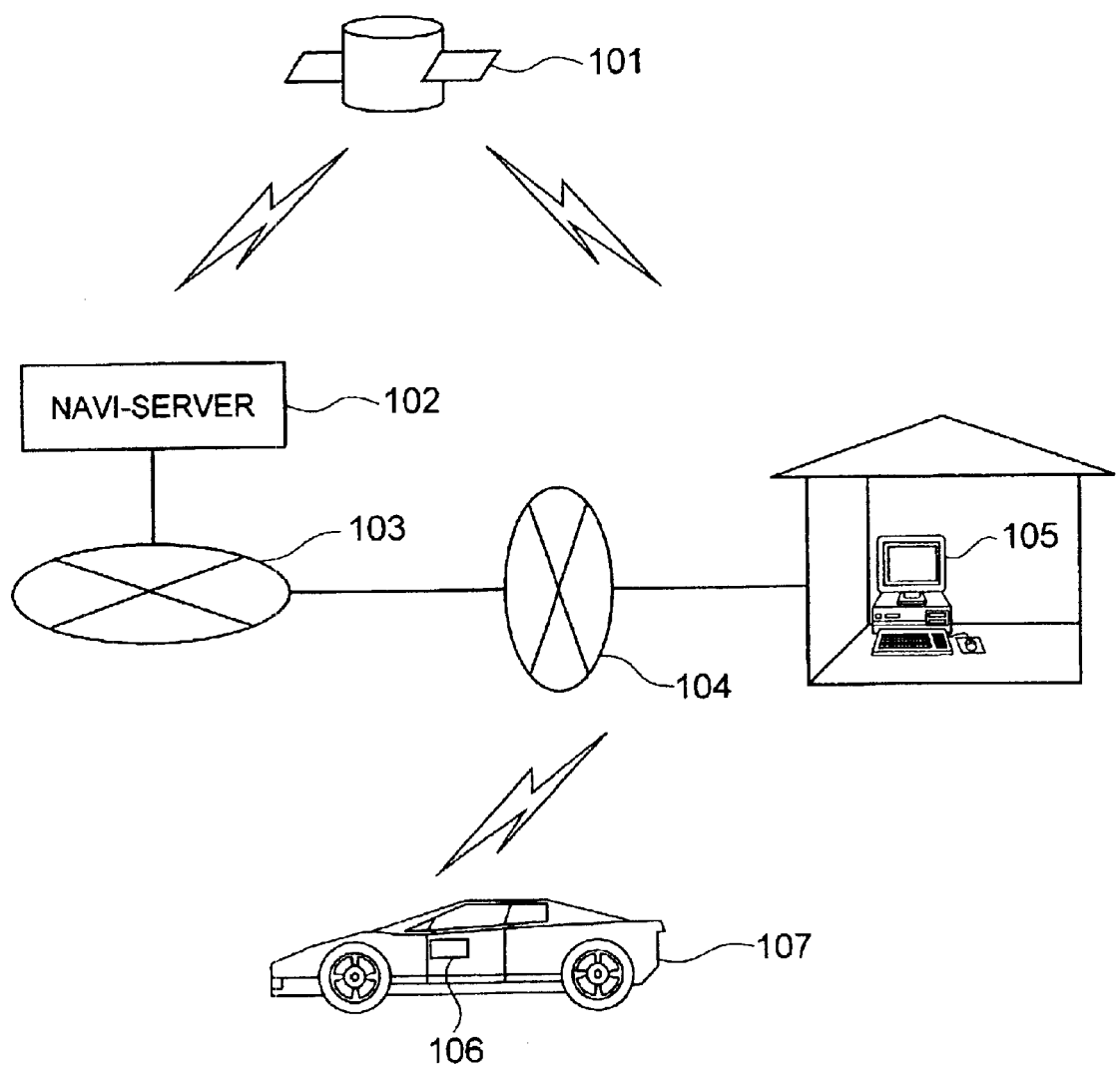
FIG. 1 is a view showing a concept of a terminal apparatus according to the present invention.

FIG. 1 is a view showing a concept of a signal transmission and receiving system including a terminal apparatus according to the present invention. Reference numeral 101 denotes a broadcasting satellite. Reference numeral 102 denotes a navigation server (hereinafter simply referred to as a navi server). Reference numeral 103 denotes an Internet. Reference numeral 104 denotes a telephone. Reference numeral 105 denotes a PC at a store or in a house. Reference numeral 106 denotes a terminal apparatus. Reference numeral 107 denotes a car with the terminal apparatus 106 installed.

A broadcasting signal from the broadcasting satellite 101 is received by the navi server 102, and sent through the Internet 103 and the telephone 104 to the PC 105 at the store or in the house. Alternatively, the broadcasting signal from the broadcasting satellite 101 is directly transmitted to the PC 105 at the store or in the house. The terminal apparatus 106 within the car 107 receives data transmitted through the telephone 104 or the Internet 103 from the navi server 102.

Figure 2:
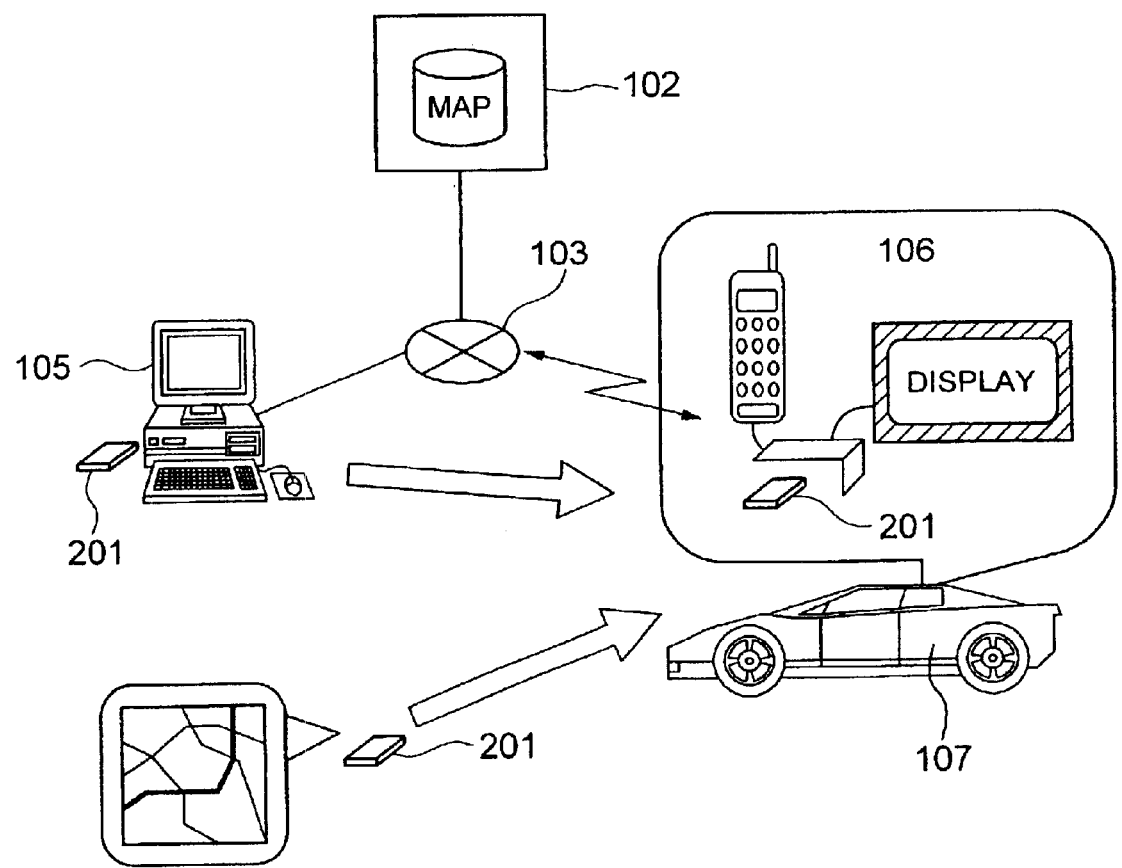
FIG. 2 is a view showing an example of the terminal apparatus according to the invention.

Referring now to FIG. 2, there are three modes to download. The terminal apparatus 106 is connected to the Internet 103 to download via the PC at the store or in the house. A portable telephone may be used to download at an outside. A memory card 201 storing the simple maps may be bought and inserted into the terminal apparatus 106 to download.

Herein, the simple map means any one of the following three items, or a combination thereof.

(1) Maps made up of principal roads consisting of the specific sorts of roads, for example, expressways and national roads.
(2) Rough maps at lower level.
(3) Display maps that dons not include any map for retrieval.

Figure 3:
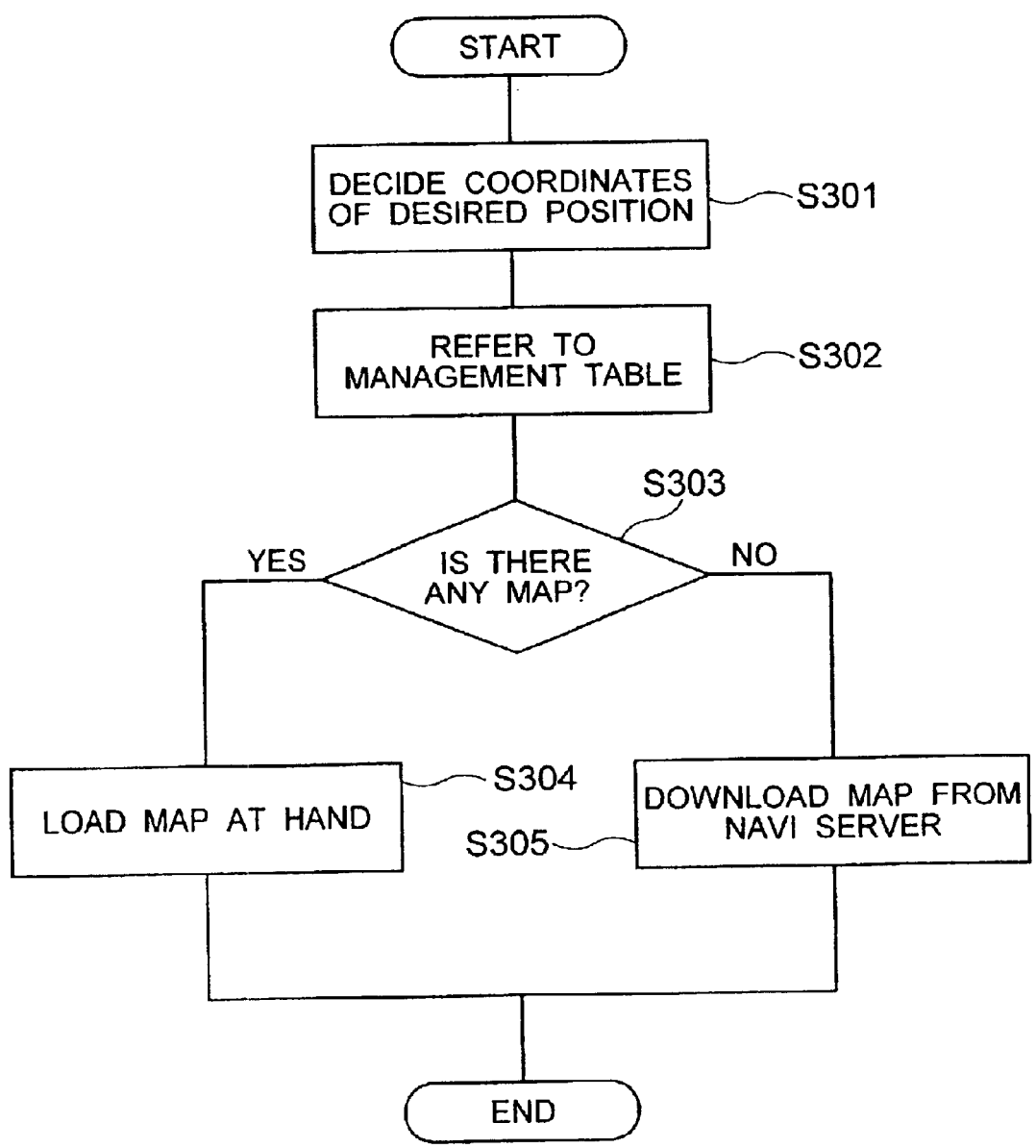
FIG. 3 is a flowchart when the terminal apparatus of the invention loads a map.

FIG. 3 is a flowchart when the terminal apparatus loads the map. First of all, coordinates (latitude and longitude) of a desired place is decided (S301). Then, reference is made to a management table (e.g., a management table of FIG. 10) (S302), and it is checked whether or not there exists a map (S303). If there is a map, the map is loaded from the memory card 201 at hand or provided in the terminal apparatus 106 of FIG. 2 (S304). If not, map data is downloaded from the navi server 102 of FIG. 2.

Figure 4:
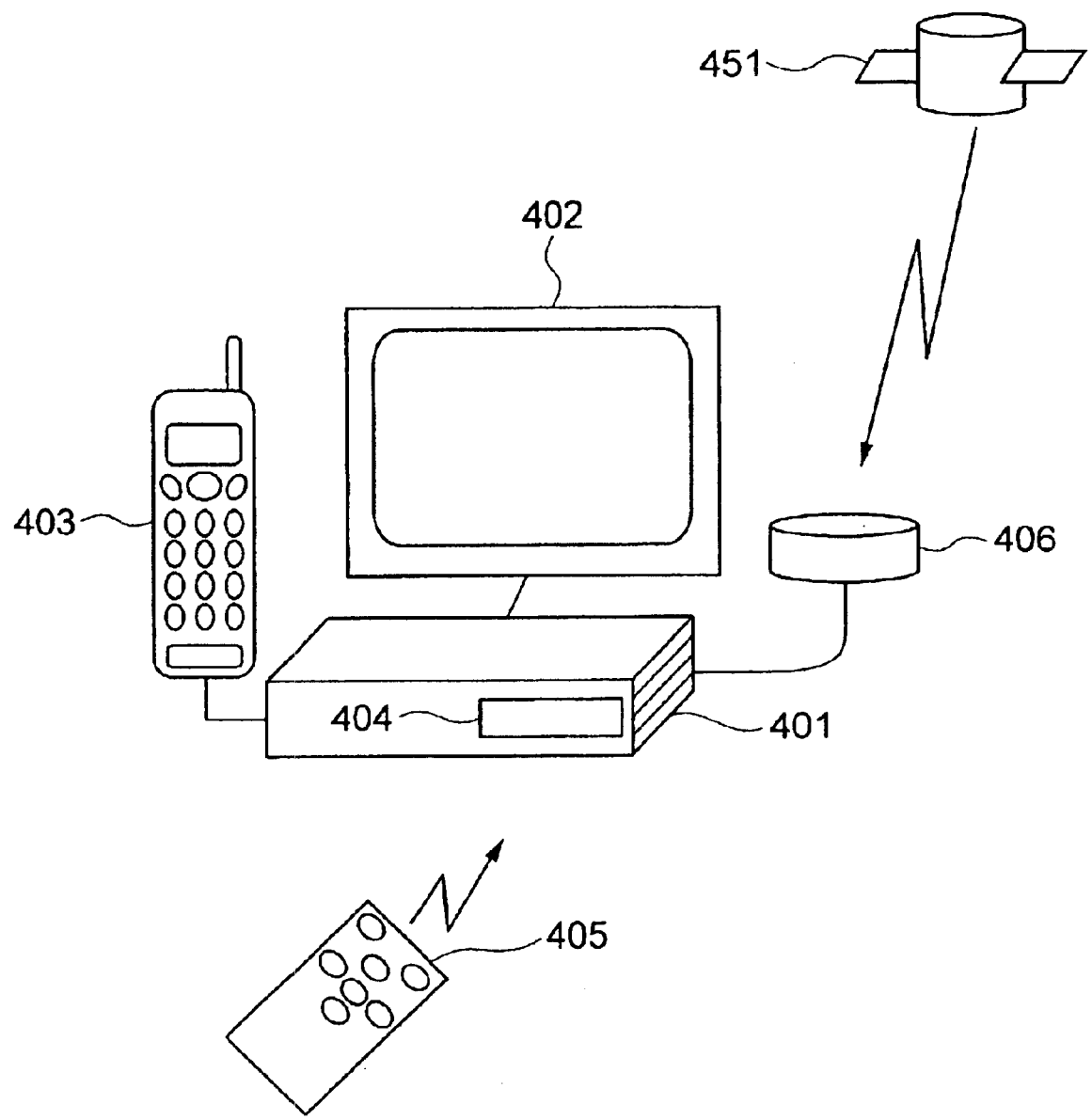
FIG. 4 is an external view of an example of the terminal apparatus of the invention.

Herein, the decision of the coordinates (latitude and longitude) in FIG. 3 basically is measured by a GPS receiver 406 shown in FIG. 4. During car running, the map displayed on a screen of the car-navigator is scrolled in accordance with a car position. At this time, if the map to be displayed exists in the terminal apparatus 106 of FIGS. 1 and 2, that map is loaded, or if the map does not exist, the latitude and longitude of the current place are transmitted to the navi server 102 to download the map. Also, when it is found that the map at the car position does not exist in the terminal apparatus 106, the latitude and longitude of the car position are transmitted to the navi server 102 to download the map, which is shown in a flowchart of FIG. 12.

A storage area for storing the management table is stored in the memory card 201. The memory card 201 also stores the map. While the software of the terminal apparatus 106 is being executed, the management table may be directly read from the memory card 201, or loaded into a DRAM 607 of FIG. 6.

A determination whether or not the map exists at step S303 in FIG. 3 is performed by the software of the terminal apparatus 106. Specifically, it is a plug-in 501 of FIG. 5. As the software processing, a browser 502 receives an HTML file with map data name written, then the map data is received by the plug-in 501, and the plug-in 501 is activated to process the map data. Accordingly, a determination whether or not the map exists (rather, the overall processing of flow) is performed by the software (plug-in 501).

Figure 12:
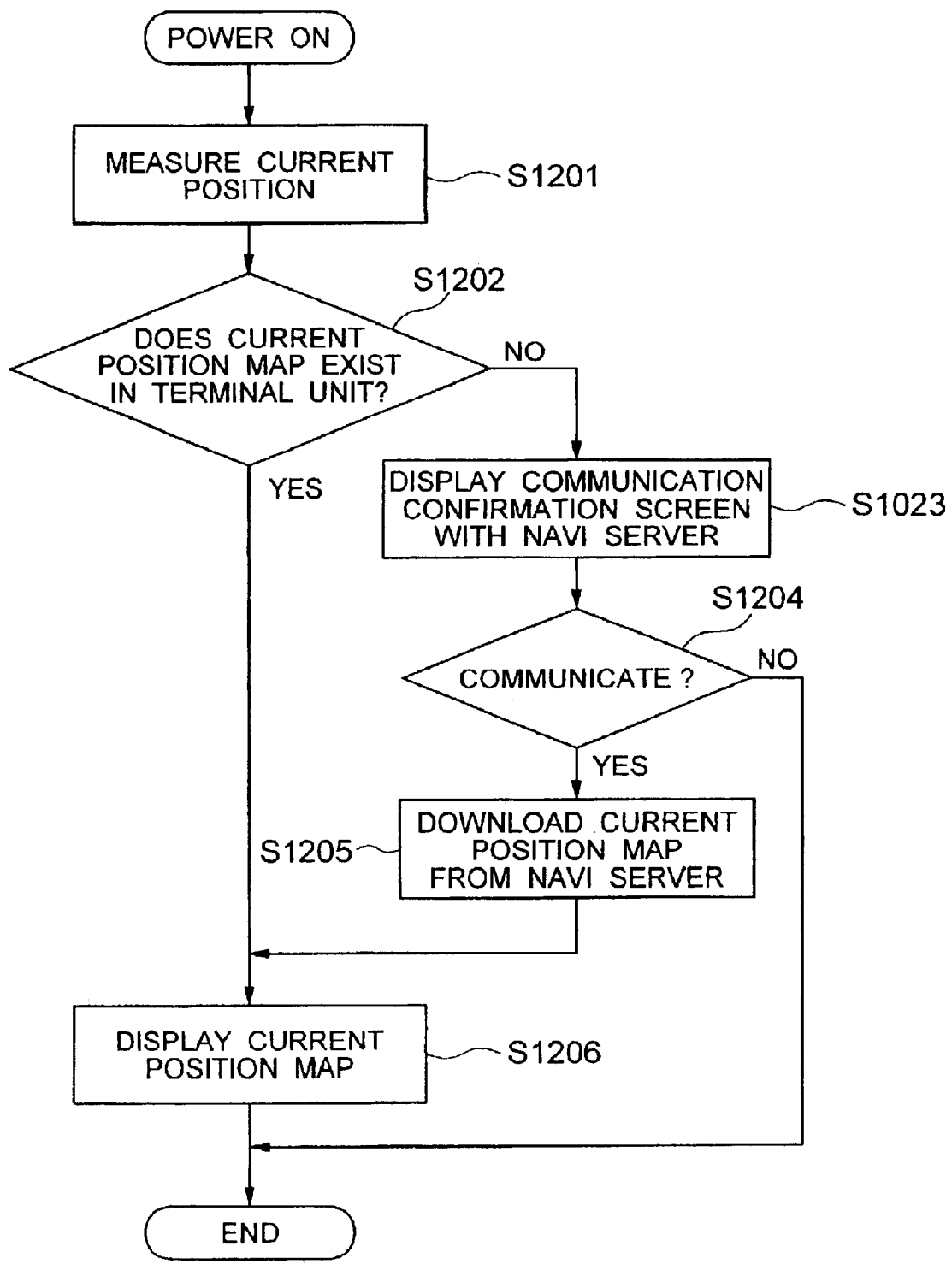
FIG. 12 is a flowchart when the terminal apparatus displays a map of a current position.

Referring now to FIG. 4, the terminal apparatus 106 comprises a terminal apparatus main body 401, a display 402, a portable telephone 403, a memory card slot 404 provided in the terminal apparatus main body 401, a remote controller 405, and a GPS (Global Positioning System) receiver 406. Herein, the memory card 201 shown in FIG. 2 is inserted into the memory card slot 404. Referring also to FIG. 12, the GPS receiver 406 measures its own position by communicating a signal with the GPS satellite 451 (S1201). It is checked whether or not the map at the current place exists in the terminal apparatus (S1202). If it exists, the map at the current place is displayed (S1206). If it does not exist, a communication confirmation screen with the navi server is displayed (S1203), and it is checked whether or not the communication is made (S1204). If the answer is yes, the map at the current place is downloaded from the navi server (S1205), and the map at the current place is displayed (S206).

Figure 5:
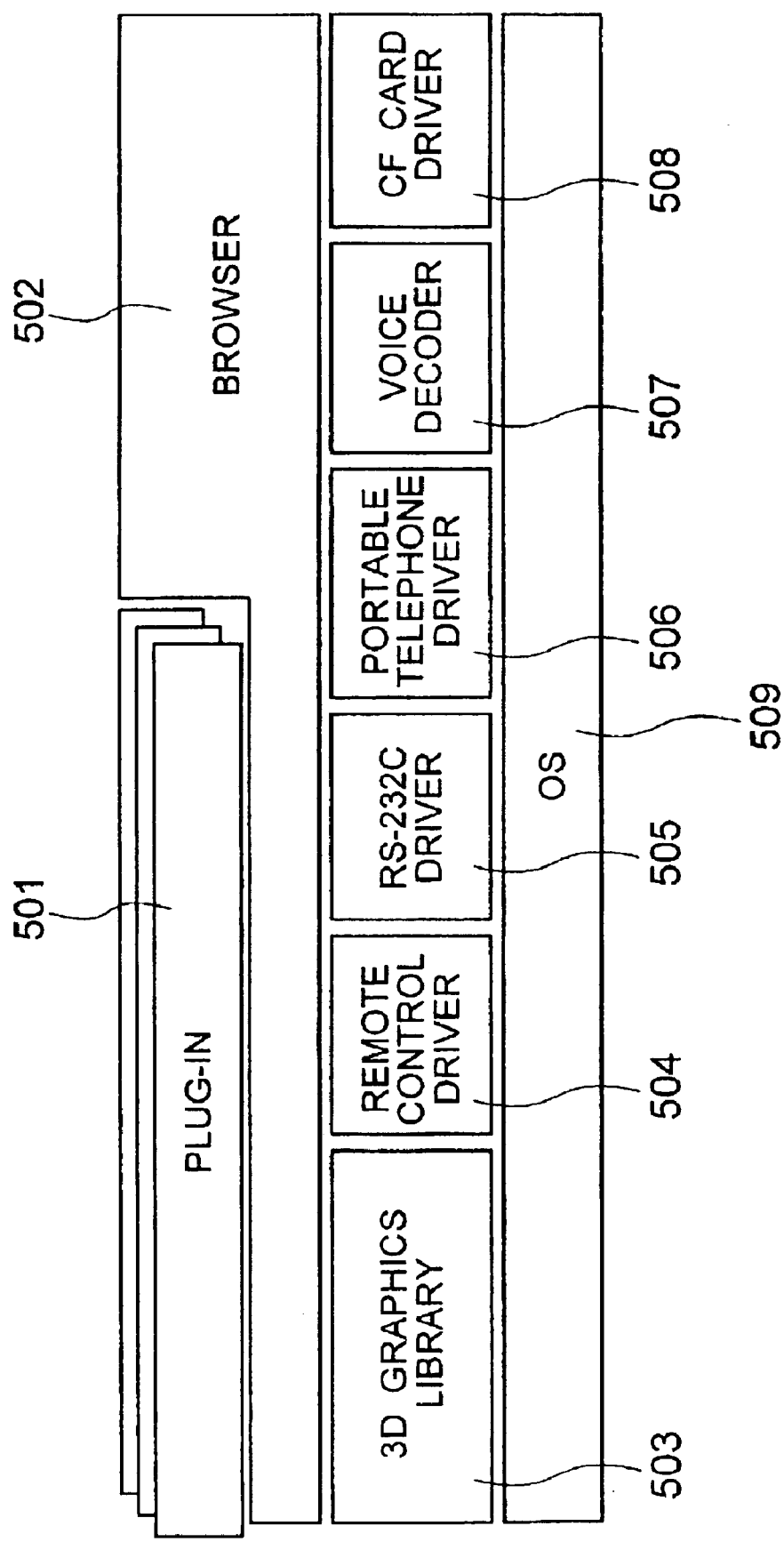
FIG. 5 is a view showing a software configuration for the terminal apparatus.

Referring now to FIG. 5, reference numeral 501 denotes a plug-in. Reference numeral 502 denotes a browser. Reference numeral 503 denotes a 3D graphics library. Reference numeral 504 denotes a remote control driver. Reference numeral 505 denotes an RS-232C driver. Reference numeral 506 denotes a portable telephone driver. Reference numeral 507 denotes a voice decoder. Reference numeral 508 denotes a CF card driver. Reference numeral 509 denotes an OS.

If a power of the terminal apparatus 106 is turned on, firstly, the browser 502 is activated. In this state, if the terminal apparatus 106 receives a signal from the remote controller 405, the remote control driver 504 interprets the signal. If the signal is a request for downloading data from a server on the Internet, for example, the browser 502 makes access to an appropriate server to download the data. In accordance with its data, the browser 502 activates an appropriate plug-in 501 to display the data, so that the user can inspect the data.

The terminal apparatus 106 employs the portable telephone 403 to make access to the server. The portable telephone driver 506 controls the portable telephone 403. In the case where the data downloaded from the server contains voice data, the voice decoder 507 can reproduce the voice data. In this case, the plug-in 501 employing the function of the voice decoder 507 is activated to reproduce the voice data.

Further, the terminal apparatus 106 has a CF (Compact Flash) card driver 508. The CF card driver 508 has a function of reading data stored in a CF card or storing the data in the CF card. To extend the function by connecting some device to the terminal apparatus 106, the terminal apparatus 106 is provided with an RS-232C port. The RS-232C driver 505 controls input or output of the data through the RS-232C port.

Figure 6:
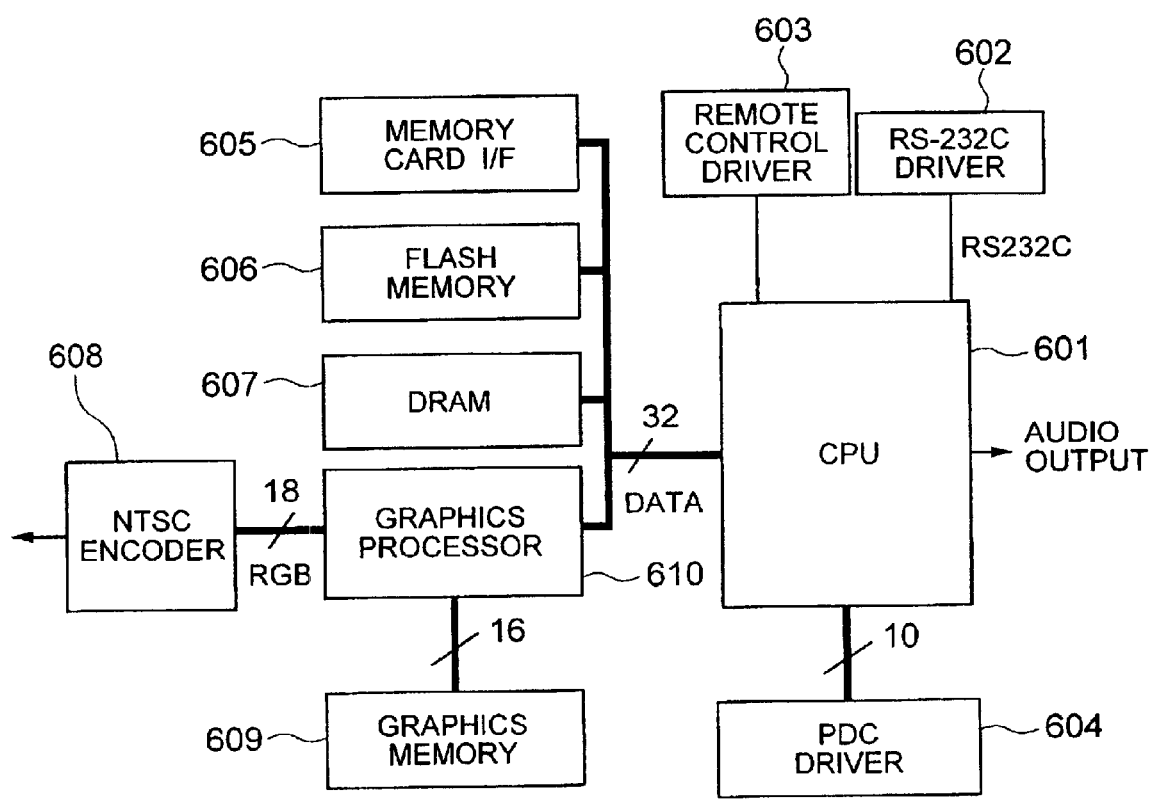
FIG. 6 is a view showing a hardware configuration for the terminal apparatus.

Referring now to FIG. 6, reference numeral 601 denotes a CPU. Reference numeral 602 denotes an RS-232C driver. Reference numeral 604 denotes a PDC driver. Reference numeral 605 denotes a memory card I/F. Reference numeral 606 denotes a flash memory. Reference numeral 607 denotes a DRAM. Reference numeral 608 denotes an NTSC encoder. Reference numeral 609 denotes a graphics memory. Reference numeral 610 denotes a graphics processor.

The CPU 601 is a processor for controlling the terminal apparatus 106 as a whole. The RS-232C driver 602 is employed to connect with an external device having an RS-232C interface. The remote control driver 603 serves to receive a signal from the remote controller. The PDC driver 604 controls communication employing a mobile telephone such as a portable telephone.

The graphics processor 610 displays an image on the display unit 402. The graphics processor 610 draws a figure in the graphics memory 609 in accordance with instruction from the CPU 601. The graphics processor 610 reads periodically the image drawn with the drawing function, and the read image is converted into an NTSC signal by the NTSC encoder 608, and displayed on the display unit 402.

The memory card I/F 605 controls input and output of the data into and from the memory card 201 inserted into the memory card slot 404. The flash memory 606 stores a program for activating the terminal apparatus 106. The flash memory 606 is a non-volatile memory, in which the contents are not lost even after the power of the terminal apparatus 106 is turned off. Accordingly, it is a suitable device for storing the program. The DRAM 607 is a dynamic RAM, and employed as a main memory for the CPU 601.

Figure 7A:
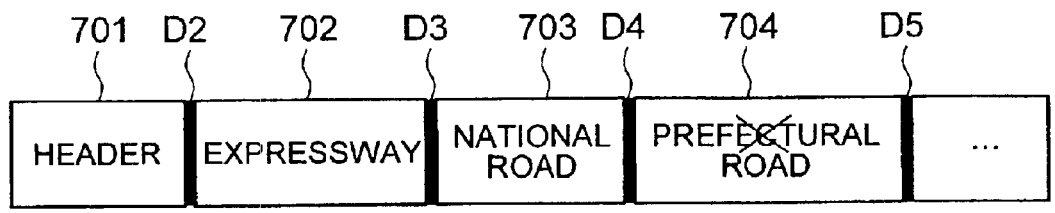
FIG. 7A is a diagram showing a map signal from a navigation server.
Figure 7B:
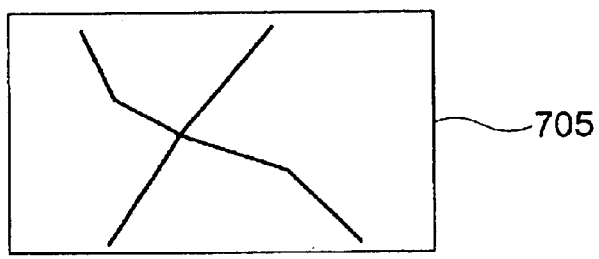
FIG. 7B is a view showing a map displayed on a display.

FIG. 7 is a diagram showing a state where a map is received from the navi server. A map signal, which is sent from the navi server 102 in FIG. 2, has a header 701 at the first location, a delimiter D2 (a flag for the next 702), an expressway component 702, a delimiter D3 (a flag for the next 703), a national road component 703, a delimiter D4 (a flag for the next 704), and a prefectural road component 704, as shown in FIG. 7A. However, the prefectural road component 704 is attached with a sign × in FIG. 7A, whereby the terminal apparatus 106 in FIG. 7A cannot receive the prefectural road component 704, resulting in an interruption. Therefore, a map including expressway alone can be displayed on the display unit.

Figure 8A:
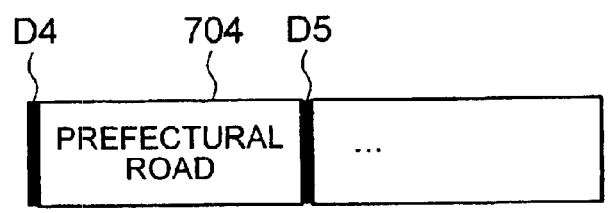
FIG. 8A is a diagram showing a retransmission map signal when there is an interruption in receiving the map from the navigation server.
Figure 8B:
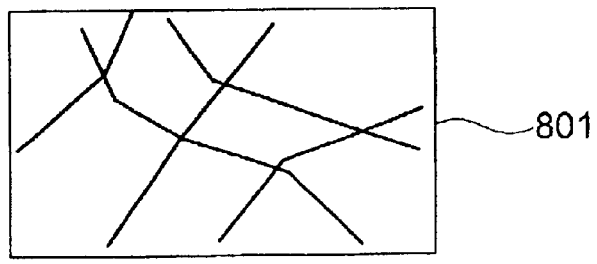
FIG. 8B is a view showing a map displayed on the display.

FIG. 8 is a diagram showing a retransmission state when a map signal from the navi server is interrupted. When receiving the map signal from the navi server is interrupted, the retransmitted data involves the prefectural road component 704 with the delimiter D4 (the flag for 704) is received, as shown in FIG. 8A. Accordingly, fine map data including the prefectural roads as well can be always received, as shown in FIG. 8B.

FIG. 9 is a flowchart for receiving the map from the navi server. First of all, the header is received and the number of delimiters is confirmed (S901). And it is checked whether or not all the delimiters have been received (S902). If the answer is yes, the reception is ended. If the answer is no, it is checked whether or not there is reception disturbance (S903), in which if the answer is no, the procedure returns to step S902, or if the answer is yes, the data following the delimiter that could not be received is demanded (S904). Then the procedure returns to step S902, and if all the delimiters have been received, the reception is ended.

FIG. 10 is a table showing an example of the management table of map data held by the terminal apparatus 106. The terminal apparatus 106 can determine whether or not the map data should be downloaded by referring to the management table when the map is needed. The management table is composed of the mesh ID 1001, the download date and hour 1002, and the term of service 1003. By making reference to the mesh ID 1001, it can be found whether or not a desired map exists in the terminal apparatus 106. If the desired map exists, the map is not downloaded, or if not, the map is downloaded. However, even if the required map is stored in the terminal apparatus 106, a considerable time may have elapsed from the time of downloading, or the term of service may be pressing or have been passed. Accordingly, even if the map exists in the terminal apparatus 106, the map must be downloaded in some cases. Therefore, the terminal apparatus 106 may determine whether or not the map is downloaded by referring to the download date and hour 1002 and the term of service 1003.

Figure 11:
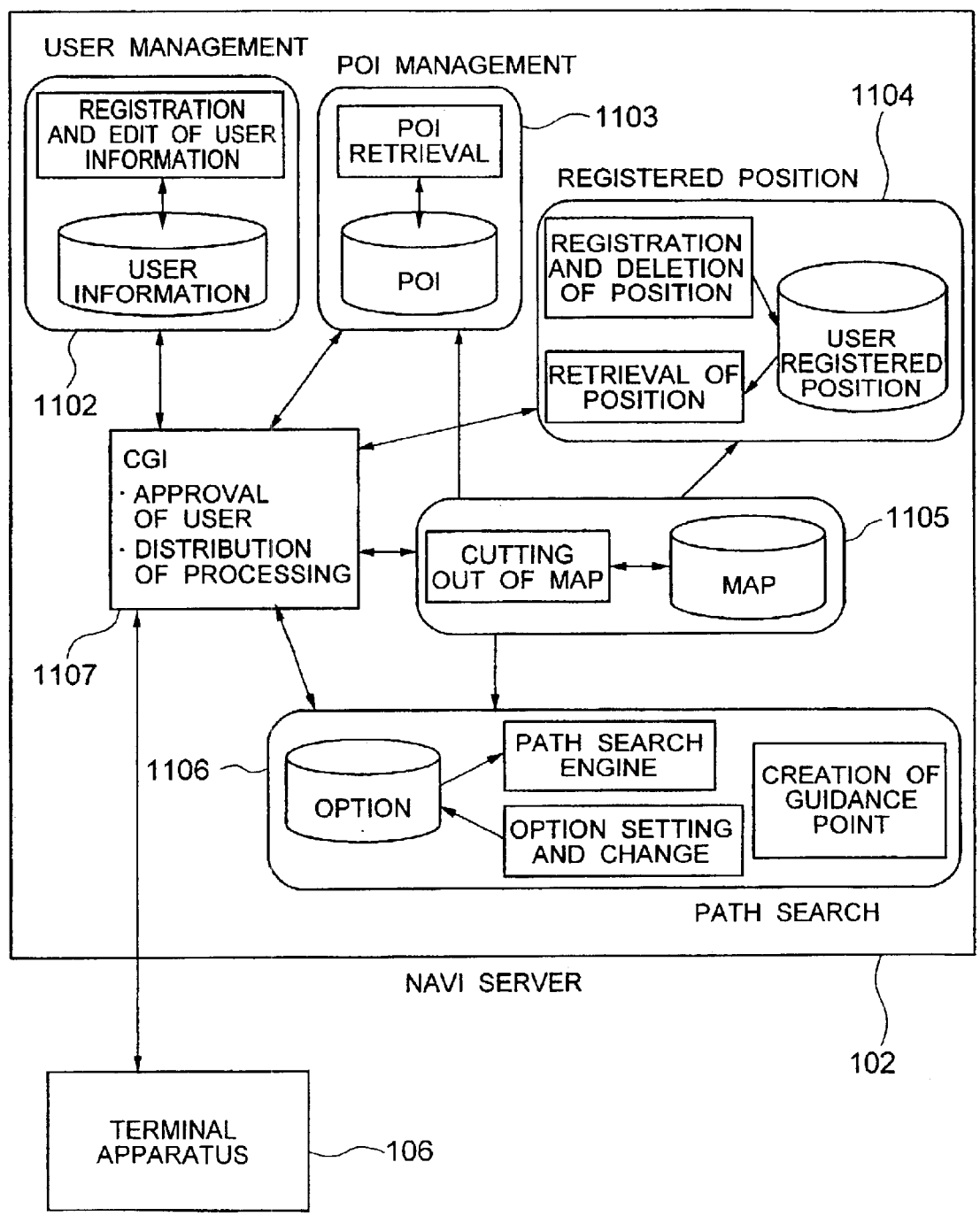
FIG. 11 is a view showing the configuration of the navigation server of FIG. 2 and the terminal apparatus.

FIG. 11 is a view showing the configuration of the navi server 102 of FIG. 2 and the terminal apparatus. The navi server 102 comprises a user management section 1102, a POI management section 1103, a registered place information section 1104, a map information section 1105, a guidance point creation section 1106, and a CGI 1107 for effecting approval of the user and distribution of the processing, in connection with each section.

The CGI 1107 processes a request from the terminal apparatus 106, and activates an appropriate process. The user management section 1102 manages the user information. The user management section 1102 manages user ID and password, and determines whether or not a user who is logging in can accept the service.

The POI management section 1103 serves to retrieve or register the POI (Point Of Interests). For example, when a request for retrieving "restaurants in city A" is issued from the terminal apparatus 106, the POI management section 1103 retrieves appropriate information. Note that this information contains at least the latitude, the longitude and the name of place. In this case, the restaurant name may be employed. The terminal apparatus 106 that has received the retrieved information may display the information, or set up the retrieved place as the destination or transfer place. Alternatively, the terminal apparatus 106 may make registration of the place, and at a next time and following service, the place may be set up as the destination or transfer place.

The registered place information section 1104 manages the places that the user has registered. In the above, an example of registering the place in the terminal apparatus 106 has been stated, but the navi server 102 can also provide a function of registering the place. For example, when the user drives to a certain place, the latitude and longitude, and name of the restaurant where the user dropped in are uploaded to the navi-sever 102, and then the navi server 102 registers the place in the registered place information section 1104. Thereafter, the user downloads the information of registered place from the registered place information section 1104, and can set up the place as the destination or transfer place. The registered places may be managed for each user or can be referred by other users.

The map information section 1105 manages the map information, and cuts out a map upon a request from the terminal apparatus 106. The map data held by the navi server 102 is called a vector map for use with the car-navigator commercially available. The terminal apparatus 106 sends the latitude and longitude of that place to the navi server 102, when a map is required, the latitude and longitude being passed to the map information section 1105, which cuts out the map around an area at the latitude and longitude. The map data is composed of a set of small divisions called a mesh, and when a map is cut out, some sheets of mesh around the area at the latitude and longitude are taken out. The number of sheets is requested from the terminal apparatus 106. Also, the scale is also requested from the terminal apparatus 106.

The path search section 1106 performs the path search. From the terminal apparatus 106, it receives a start place, an end place, transfer places and search conditions, performs a path search on the basis of them, and sends back a search result to the terminal apparatus 106. The search result includes a series of latitudes and longitudes of all the passing places arranged in the passing order, a series of all the link IDs in the passing order, and the information of the guidance points. Herein, the guidance point is a place needed to be guided which way to proceed at the intersection, and involves the latitude, the longitude and the guidance direction. Also, the search conditions are those in performing the path search, for example, "expressway preferential", "national road preferential" and "distance preferential". Note that the search conditions are sent from the terminal apparatus 106, or may be stored in the navi server 102 in advance. In this case, the search conditions may be different from one user to another, and must be managed for each user.

The path retrieval section 1106 performs path retrieval. It receives a start place, an end place, transfer places and retrieval conditions from the terminal apparatus 106, performs the path retrieval on the basis of them, and sends back retrieval result to the terminal apparatus 106. The search result includes a series of latitudes and longitudes of all the passing places arranged in the passing order, a series of all the link IDs in the passing order, and the information of the guidance points. Herein, the guidance point is a place necessary to be guided which way to proceed at a intersection, and involves the latitude, the longitude and the guidance direction.

FIG. 12 is a flowchart when the terminal apparatus displays a map of a current place. Herein, the terminal apparatus 106 of FIG. 2 has the GPS receiver 406, as shown in FIG. 4. In FIG. 12, first of all, the GPS receiver 406 measures its current place (S1201). Then, it is checked whether or not a map at the current place exists in the terminal apparatus (S1202). If the answer is yes, the map at the current position is displayed (S1206). If the answer is no, a communication confirmation screen with the navi server is displayed (S1203). And it is checked whether or not communication is made (S1204). If the answer is no, the procedure is ended. If the answer is yes, the map at the current place is downloaded from the navi server (S1205), and the map at the current place is displayed (S1206).

Figure 13:
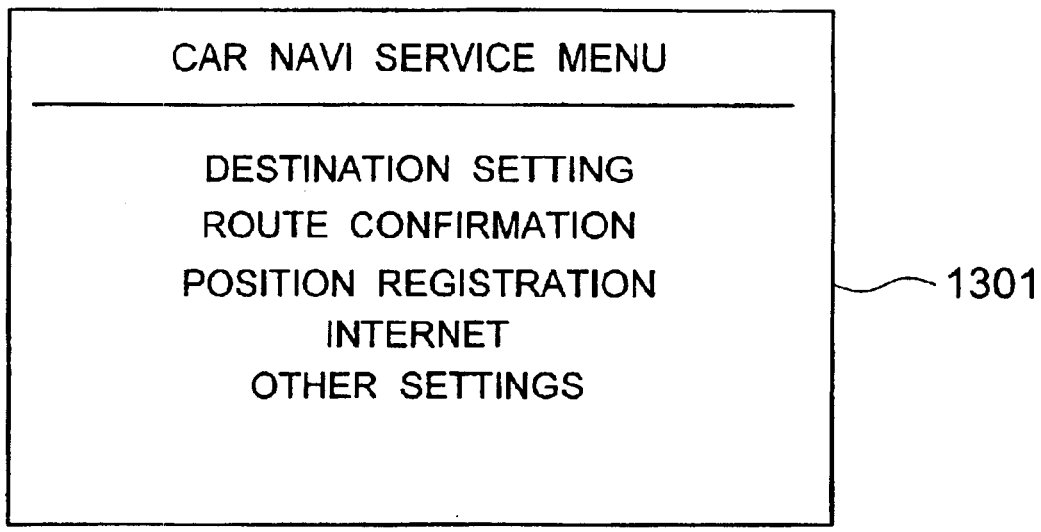
FIG. 13 shows a selection screen for a car navigation service menu.

FIG. 13 is a selection screen of car navigation service menu. A selection screen 1301 of the car navigation service menu is a display screen of the display 402 of FIG. 4, and displays destination setting, route confirmation, place registration, Internet and setting as the car navigation service menu.

Figure 14:
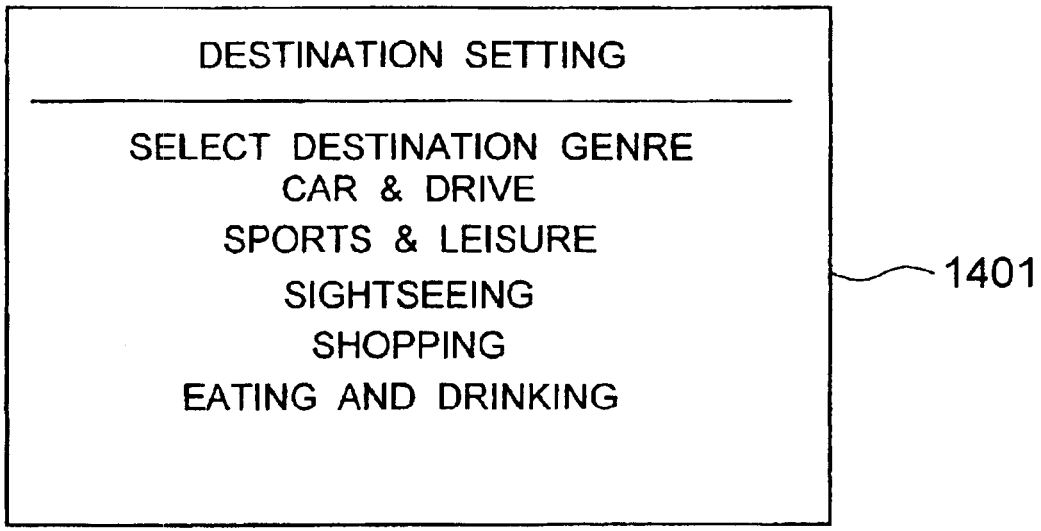
FIG. 14 shows a selection screen for a destination set-up.

FIG. 14 is a selection screen of the destination setting. The selection screen 1401 for the destination setting is a next selection screen when the destination setting is selected in the selection screen 1301 of FIG. 13. The selective items of destination setting include car & drive, sports & leisure, sightseeing, shopping, eating and drinking, lodging, and transportation.

Figure 15:
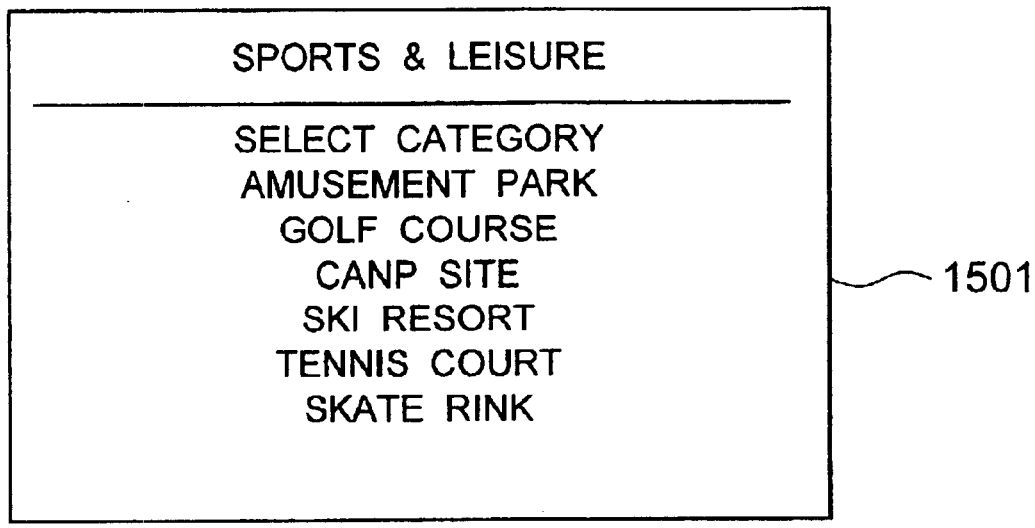
FIG. 15 shows a selection screen for sports and leisure.

FIG. 15 is a selection screen of the sports & leisure. The selection screen 1501 of the sports & leisure is a next selection screen when the sports & leisure is selected in the selection screen 1401 of FIG. 14. The selective items of sports & leisure include amusement park, golf course, camp-ground, ski resort, tennis court, and skating rink.

Figure 16:
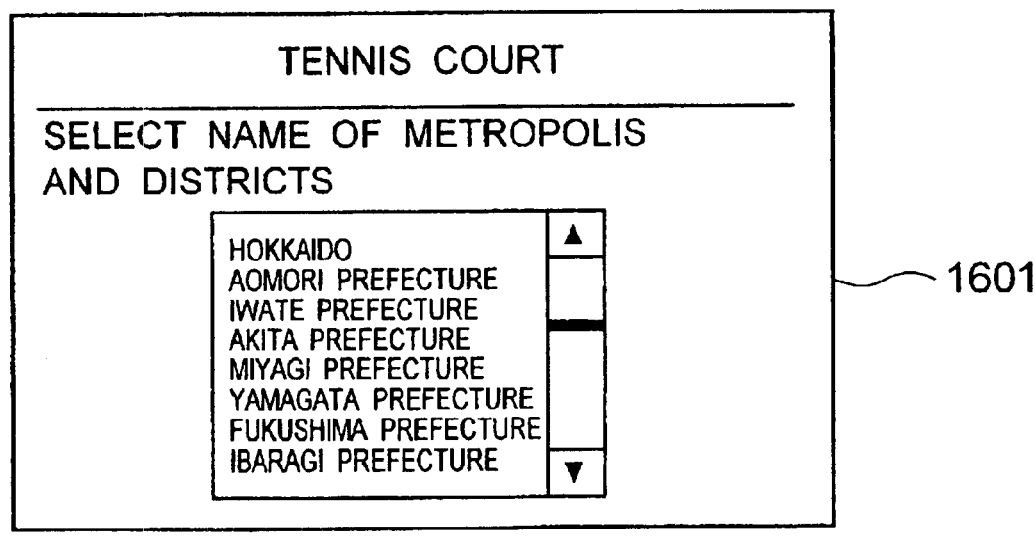
FIG. 16 shows a selection screen for a tennis court.

FIG. 16 is a selection screen of the tennis court. The selection screen 1601 of the tennis court is a next selection screen when the tennis court is selected in the selection screen 1501 of FIG. 15. The selective items of tennis court include Hokkaido, Aomori Prefecture, Iwate Prefecture, Akita Prefecture, Miyagi Prefecture, Yamagata Prefecture, Fukushima Prefecture and Ibaragi Prefecture.

Figure 17:
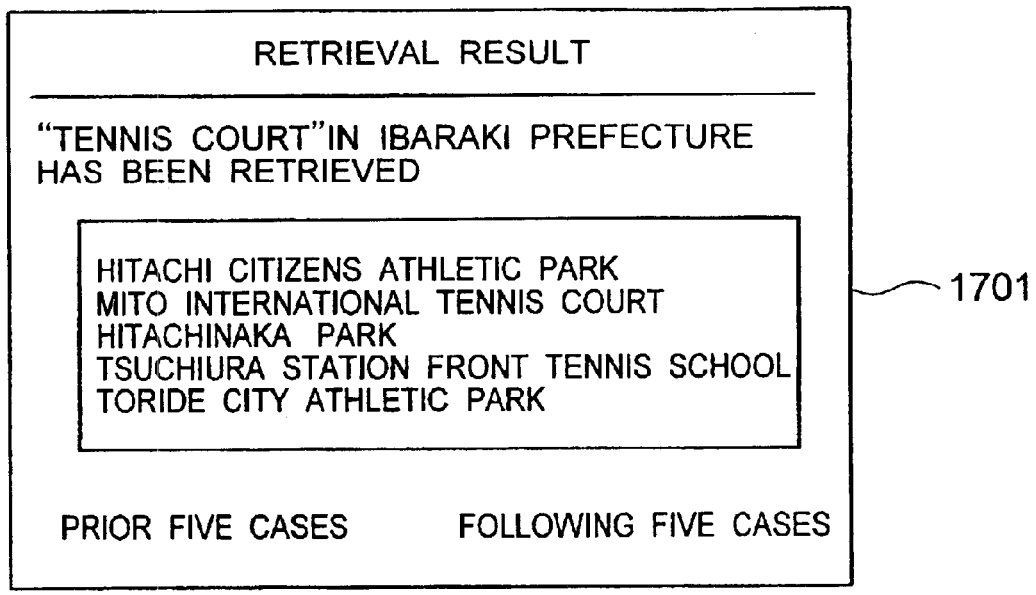
FIG. 17 is a screen showing a retrieved result.

FIG. 17 is a screen representing the retrieval result. A screen 1701 represents a retrieval result when Ibaragi Prefecture is selected in the selection screen 1601 of FIG. 16. The items of the retrieval result include Hitachi Citizens Athletic Park, Mito International Tennis Court, Hitachinaka Park, Tsuchiura Station Front Tennis School, and Toride City Athletic Park.

Figure 18:
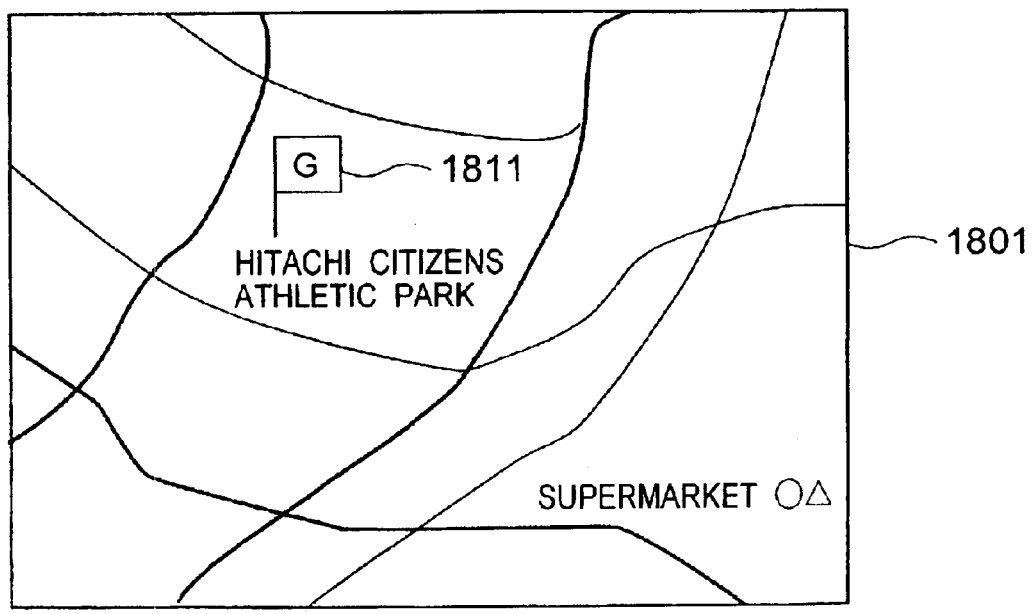
FIG. 18 is a road map around Hitachi Citizens Athletic Park.

FIG. 18 is a road map around the Hitachi City Athletic Park. A road map 1801 around the Hitachi City Athletic Park is one when Hitachi City Athletic Park is selected in the screen 1701 representing the retrieval result of FIG. 17. The road map shows the Hitachi City Athletic Park 1801 of the destination, and the expressways, national roads, and prefectural roads around it.

Figure 19A:
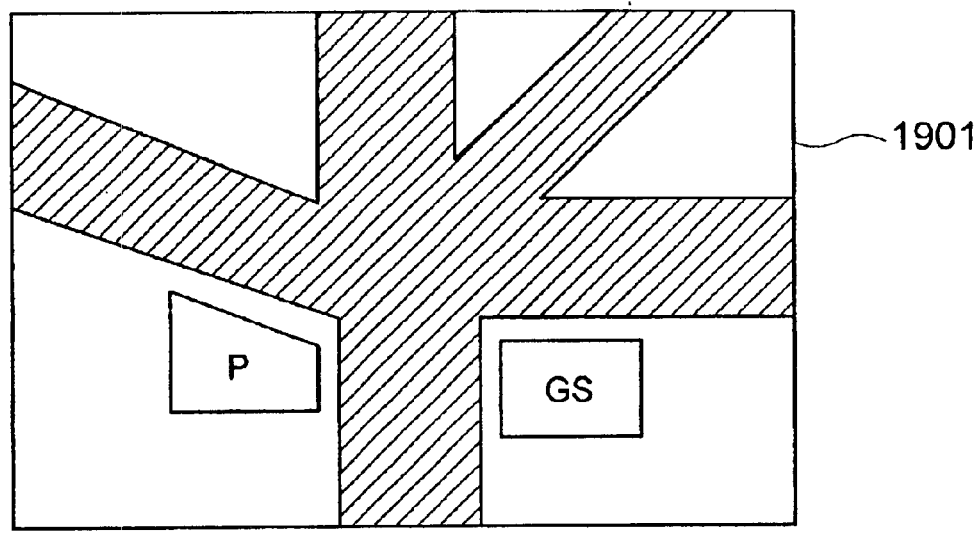
FIG. 19A is a sectional map including a guidance point.
Figure 19B:
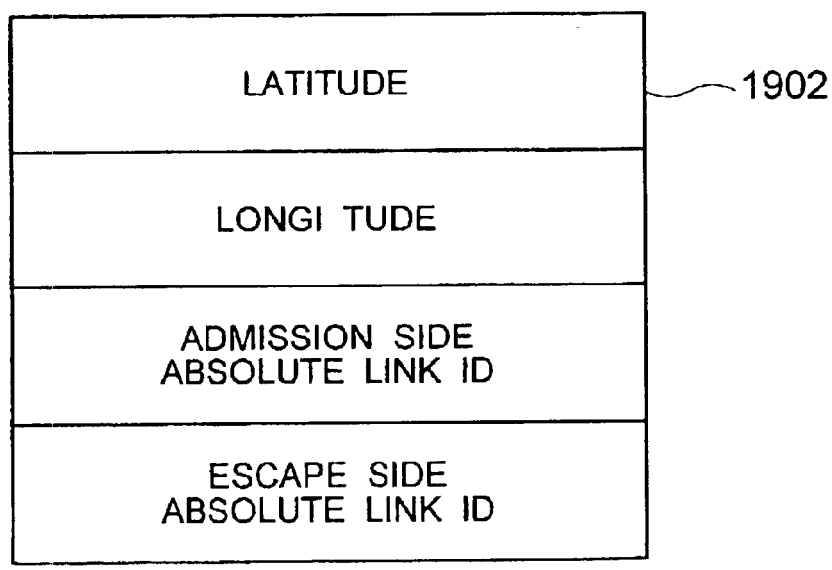
FIG. 19B is the guidance point data for producing a guide map including the guidance point.

FIG. 19 shows an example of the information that the terminal apparatus 106 downloads as the guidance point information. FIG. 19A is a small sectional map 1901 containing the guidance point, and FIG. 19B is the guidance point data 1902 for creating a guide map containing the guidance point. The small sectional map 1901 may be created in the navi server 102, or created in the terminal apparatus 106 on the basis of the guidance point data 1902.

The small sectional map 1901 is displayed on the display unit 402 when the car 107 comes closer to the guidance point. For example, it is displayed about 300 meters before reaching the guidance point. Naturally, the small sectional map 1901 is necessary to be created before that.

The guidance point data 1902 is those for creating a map containing the guidance point, including, for example, the latitude and longitude of the guidance point, the admission side absolute link ID, and the escape side absolute link ID. The guidance point data 1902 is downloaded into the terminal apparatus 106, together with the result of path search in the navi server 102, and therefore, when the car 107 starts to move, the guidance point data 1902 is already held in the terminal apparatus 106. Accordingly, while always grasping whether or not the car 107 is approaching to the guidance point, the small sectional map 1901 can be created and displayed, if the car approaches the place where the small sectional map 1901 should be displayed.

Also, the small sectional map 1901 may be created in the navi server 102, and downloaded into the terminal apparatus 106. In this case, if the guidance point information is held by the navi server 102, it may be possible that the terminal apparatus 106 transmits the latitude and longitude of the car 107 to the navi server 102 and the navi server 102 creates the small sectional map 1901. If the navi server 102 does not have the path information, the terminal apparatus 106 transmits the guidance point information to the navi server 102 and the navi server 102 creates the small sectional map 1901.

Figure 20:
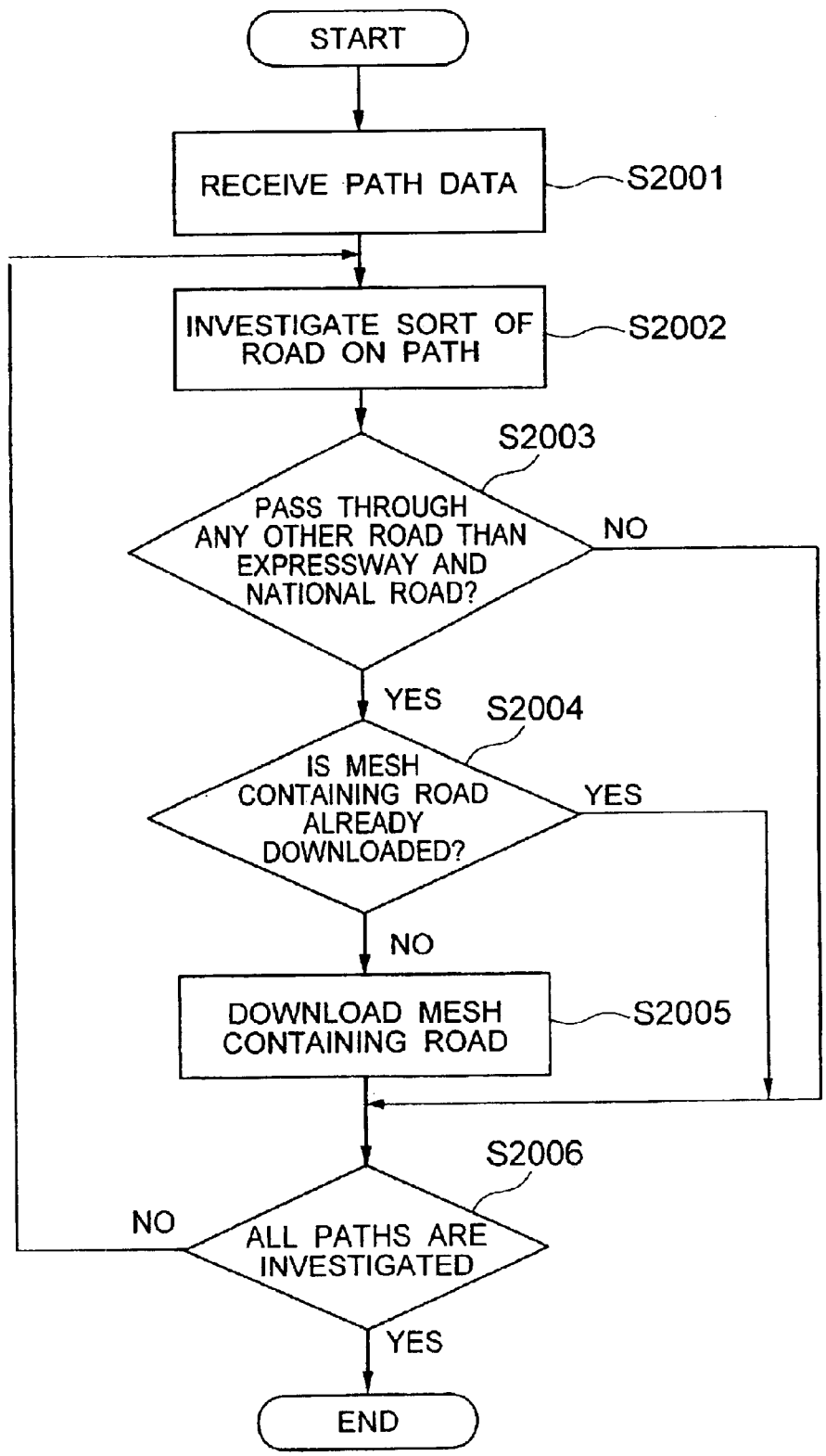
FIG. 20 is a flowchart for determining whether or not a map is downloaded from the navigation server.

FIG. 20 is a flowchart for determining whether or not a map is downloaded from the navi server. First of all, the path data is received (S2001), and the sort of road on the path is investigated (S2002). It is checked whether or not the car passes through any other road than the expressway and the national road (S2003). If the answer is yes, it is checked whether or not a mesh containing the road is already downloaded (S2004), and if the answer is no, the mesh containing the road is downloaded (S2005). Then it is checked whether or not all the roads are investigated (S2006). If the answer is no, the procedure returns to step S2002. If the answer is no at step S2003, and if the answer is yes at step S2004, the procedure transfers to step S2006. And if the answer is yes at step S2006, the procedure is ended.

Figure 21:
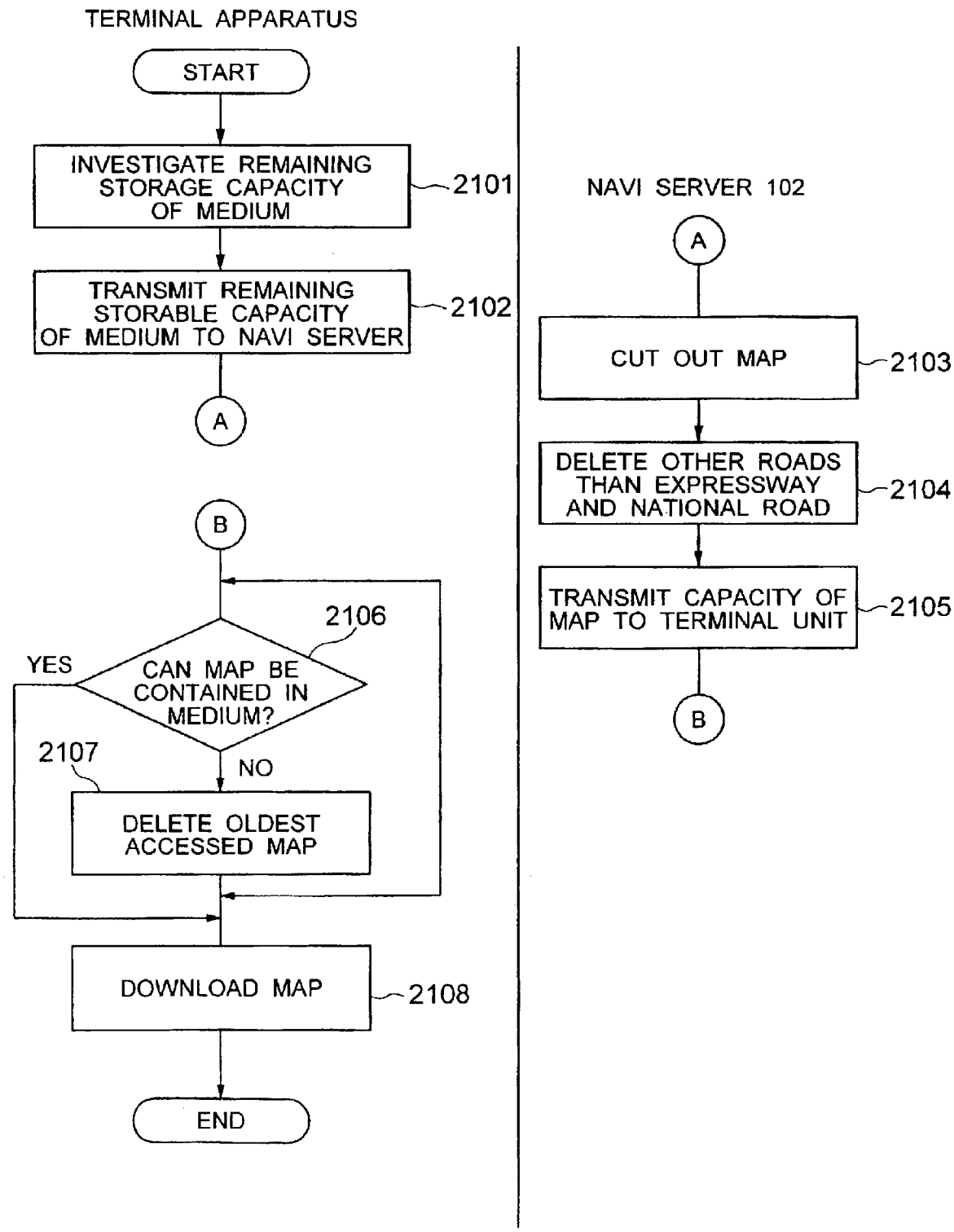
FIG. 21 is a flowchart for downloading a map edited in accordance with a remaining storable capacity of a medium for the simple map at the time of downloading a map from the navigation server.

FIG. 21 is a flowchart for downloading a map edited in accordance with a remaining storable capacity of a medium for the simple map at the time of downloading a map from the navigation server.

First of all, the remaining storable capacity of the medium 201 for the simple map is investigated (S2101). Then, the remaining storable capacity, together with a map of a desired place, is transmitted to the navi server 102. The navi server 102 receives the transmitted signal, and cuts out the map of the desired place (S2103). And if the remaining storable capacity is equal to or less than the total map capacity, the roads other than the expressway and the national road are deleted (S2104). Then, map capacity is transmitted to the terminal apparatus 106 (S2105).

The terminal apparatus 106 receives the transmitted signal, and checks whether or not the map can be contained in the medium (S2106). If the answer is no, the oldest accessed map is deleted (S2107). The procedure returns to step S2106. If the answer is yes at step S2106, the procedure transfers to step S2108 to download the map.

What is claimed is:

1. A map data distribution method for a mobile body comprising the stops of:
   receiving coordinate information of a present place and destination of the mobile body from an on-board terminal;
   retrieving a recommended route based on the received information of the present place and destination;
   obtaining map data which is structured as a set of meshes including the recommended route from map data stored in a map data database,
   wherein each mesh of said set of meshes includes road information which is divided into a plurality of groups of information according to different types of roads such that information of roads of the same type are included in the same group; and
   transmitting, as retrieved map data, the road information to the on-board terminal such that the groups of information are transmitted according to a predetermined order based on the different types of road.

2. A map data distribution method according to claim 1, wherein said receiving step further receives an indication of an amount of the retrieved map data to be transmitted; and
   wherein said method further comprising the step of:
   editing a data amount of the retrieved map data to be transmitted so that the retrieved map data to be transmitted becomes less than the indicated amount of retrieved map data to be transmitted, when the amount of the retrieved map data to be transmitted is larger than the indicated amount.

3. A map data server comprising:
   means for receiving a map retrieval demand including positional information of a destination or a place on a route and positional information of a present place of a mobile body from an on-board terminal and for transmitting retrieved map data to the on-board terminal;
   means for retrieving a recommended route based on the positional information of the destination or the place on the route and the positional information of the present place of the received map retrieval demand; and
   a map information section including a map cut out means to obtain map data which is structured as a set of meshes including the recommended route from map data stored in a map data database,
   wherein said map information section divides road information included in each of the meshes into a plurality of groups of information according to different types of roads such that information of roads of the same type are included in the same group, and transmits as the retrieval map data the road information to the on-board terminal such that the groups of information are transmitted according to a predetermined order based on the different types of roads.

4. A map data server according to claim 3, wherein the map retrieval demand includes an upper limit indicating an amount of the retrieval map data to be transmitted, and
   wherein said map information section edits an amount of map data obtained from the map database so that the amount of the retrieved map data to be transmitted is smaller than the upper limit indicated in the map retrieval demand, when the amount of the retrieved map data to be transmitted is larger than the indicated upper limit.

5. A map data server according to claim 3, wherein said receiving and transmitting means receives the map retrieval demand and an upper limit indicating an amount of the retrieval map data to be transmitted, and
   wherein said map information section edits the groups of information of the road information according to the different types of roads based on the upper limit indicated in the map retrieval demand, when the amount of the retrieved map data to be transmitted is larger than the indicated upper limit.

* * * * *

UNITED STATES PATENT AND TRADEMARK OFFICE
CERTIFICATE OF CORRECTION

| | | |
|---|---|---|
| PATENT NO. | : 6,885,938 B2 | Page 1 of 1 |
| APPLICATION NO. | : 10/438102 | |
| DATED | : April 26, 2005 | |
| INVENTOR(S) | : Kimiyoshi Machii et al. | |

It is certified that error appears in the above-identified patent and that said Letters Patent is hereby corrected as shown below:

Please amend the specification as follows:

Please replace the paragraph beginning on page 5, line 23, with the following rewritten paragraph as follows:

Column 3, lines 19-23 should read

-- Figs. 19A and 19B are views showing an example of information that the terminal apparatus downloads as guidance point information; Fig. 19A is a sectional map including a guidance point; Fig. 19B is the guidance point data for producing a guide map including the guidance point; --.

Signed and Sealed this

Second Day of January, 2007

JON W. DUDAS
*Director of the United States Patent and Trademark Office*